United States Patent
Saito

[11] Patent Number: 5,661,716
[45] Date of Patent: Aug. 26, 1997

[54] MAGNETO-OPTICAL RECORDING MEDIUM AND REPRODUCING METHOD THEREFOR

[75] Inventor: Ichiro Saito, Yokohama, Japan

[73] Assignee: Canon Kabushiki Kaisha, Tokyo, Japan

[21] Appl. No.: 434,766

[22] Filed: May 4, 1995

[30] Foreign Application Priority Data

May 9, 1994 [JP] Japan ................... 6-094744

[51] Int. Cl.$^6$ ........................................... G11B 7/00
[52] U.S. Cl. ................ 369/275.1; 369/286; 369/283; 369/13; 369/100
[58] Field of Search ................ 369/275.2, 13, 369/47, 48, 49, 54, 58, 59, 93, 94, 100, 283, 284, 275.1, 275.3, 286

[56] References Cited

U.S. PATENT DOCUMENTS

| 5,428,597 | 6/1995 | Satoh et al. ................ 369/94 X |
| 5,511,057 | 4/1996 | Holtslag et al. ................ 369/94 |

FOREIGN PATENT DOCUMENTS 3-278346  12/1991  Japan.
4-113532  8/1992  Japan.

OTHER PUBLICATIONS

IEEE Translation Journal of Magnetics in Japan, vol. 7, No. 9, Sep. 1992, pp. 685–693, Kaneko, et al., "Super Resolution in Optical Disks".

*Primary Examiner*—Muhammad N. Edun
*Attorney, Agent, or Firm*—Fitzpatrick, Cella, Harper & Scinto

[57] ABSTRACT

A magneto-optical recording medium includes a substrate, a first magnetic layer formed on the substrate and constituted by a perpendicular magnetization film, a dielectric layer formed on the first magnetic layer at a side opposite to the substrate, a second magnetic layer formed on the first magnetic layer through the dielectric layer, and a third magnetic layer magnetically coupled to the second magnetic layer. Each of the first, second and third magnetic layers essentially consists of a rare earth-transition metal amorphous alloy. The first magnetic layer has a film thickness to allow transmission of light incident from the substrate to the dielectric layer while the second magnetic layer has a film thickness which does not allow transmission, of light passing through the first magnetic layer, to the third magnetic layer.

9 Claims, 4 Drawing Sheets

FIRST MAGNETIC
LAYER

SECOND MAGNETIC
LAYER

INITIALIZING STATE

DIRECTION OF MAGNETIZATION

FIRST MAGNETIC
LAYER

SECOND MAGNETIC
LAYER

FIRST MAGNETIC
LAYER

SECOND MAGNETIC
LAYER

RECORDING STATE

FIRST MAGNETIC
LAYER

SECOND MAGNETIC
LAYER

EXTERNAL MAGNETIC FIELD Hr

MAGNETO-OPTICAL RECORDING MEDIUM AND REPRODUCING METHOD THEREFOR

BACKGROUND OF THE INVENTION

1. Field of the Invention

The present invention relates to a magneto-optical recording medium capable of recording and reproduction of information with a laser beam using a magneto-optical effect and a method of reproducing information using this recording medium.

2. Related Background Art

In recent years, along with the development of the computer and processing techniques for processing a large volume of information, a high-density, large-capacity memory is required. One of the most promising media is a magneto-optical memory.

In a magneto-optical recording scheme, a laser beam irradiates a magnetic film having a perpendicular magnetic anisotropy to locally increase the temperature of the magnetic film, thereby reducing the coercive force of the heated film portion. At the same time, a recording magnetic field is applied in a direction opposite to the direction of initial magnetization, thereby performing magnetization reversal.

In this case, the linear recording density is defined by the laser wavelength $\lambda$ of a reproduction optical system and the numerical aperture (N.A.) of an objective lens.

That is, the pit period which defines the detection limit is given as $f=\lambda/2 \cdot N.A.$ In a conventional reproducing method, when a plurality of recorded pits are present within a laser spot, signals interfere with each other in a reproduction mode, and correct data cannot be reproduced.

To obtain a higher density, the laser wavelength $\lambda$ of the reproduction optical system must be shortened, and the numerical aperture N.A. of the objective lens must be increased.

However, the laser wavelength $\lambda$ of the reproduction optical system and the numeral aperture N.A. of the objective lens have limitations. Therefore, it is difficult to increase the recording density.

SUMMARY OF THE INVENTION

It is an object of the present invention to provide a magneto-optical recording medium capable of reproducing information having a period less than the diffraction limit of reproduction light which is defined by the above limitation, and a reproducing method using this recording medium.

In order to achieve the above object according to an aspect of the present invention, there is provided a magneto-optical recording medium comprising:

a substrate;

a first magnetic layer formed on the substrate and constituted by a perpendicular magnetic film;

a dielectric layer formed on the first magnetic layer at a side opposite to the substrate;

a second magnetic layer formed on the first magnetic layer through the dielectric layer; and a third magnetic layer magnetically coupled to the second magnetic layer.

In order to achieve the above object according to another aspect of the present invention, there is provided a reproducing method for a magneto-optical recording medium having a substrate, a first magnetic layer formed on the substrate and constituted by a perpendicular magnetic film, a dielectric layer formed on the first magnetic layer at a side opposite to the substrate, a second magnetic layer formed on the first magnetic layer through the dielectric layer, and a third magnetic layer magnetically coupled to the second magnetic layer and having information identical to that recorded on the first recording layer, comprising the steps of:

irradiating the medium with a laser spot from a substrate side thereof applying an external magnetic field to the medium to align, in one direction, the magnetization of the second magnetic layer which corresponds to a high temperature region in the laser spot; and detecting light of the laser beam which is reflected by the medium to generate a reproduction signal.

DETAILED DESCRIPTION OF THE PREFERRED EMBODIMENT

A magneto-optical recording medium and an information recording/reproducing method using this recording medium will be described in detail with reference to the accompanying drawings.

Structure of Magneto-Optical Recording Medium

Figure 1:
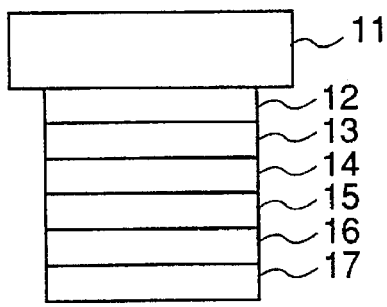
FIG. 1 is a sectional view illustrating the film structure of a magneto-optical recording medium of the present invention.

FIG. 1 is a sectional view illustrating the structure of a magneto-optical recording medium according to an embodiment of the present invention.

Referring to FIG. 1, a transparent substrate 11 is comprised of any one of various materials such as glass, PMMA, and polycarbonate. The shape of the substrate 11 is not limited to a specific one, but can be a desired shape.

A dielectric layer 12 consists of a material such as $SiN_x$, $AlN_x$, $AlO_x$, $TaO_x$, or $SiO_x$.

A first magnetic layer 13 has a large perpendicular magnetic anisotropy and can stably hold magnetization even in a state wherein a reproduction laser beam irradiates the layer 13. The first magnetic layer consists of a rare earth-iron group amorphous alloy (e.g., TbFeCo, TbFe, DyFeCo, TbDyFeCo, or GdTbFeCo), a platinum group-iron group multilayer film (e.g., Pt/Co or Pd/Co), a platinum group-iron group alloy (e.g., PtCo or PdCo), or a garnet film.

A dielectric layer 14 consists of the same material as that of the dielectric layer 12 and serves to prevent magnetic coupling between the first magnetic layer and a second magnetic layer (to be described below).

A second magnetic layer 15 consists of a material having a high Curie temperature and a low coercive force. An example of the material of the second magnetic layer 15 is a rare earth-iron group amorphous alloy such as GdCo, GdFeCo, GdDyFeCo, NdGdFeCo, or GdTbFeCo.

A third magnetic layer 16 is magnetically coupled (e.g., exchange coupling or magnetostatic coupling) with the second magnetic layer 15. The third magnetic layer consists of a material having a relatively high Curie temperature, a high coercive force, and is capable of stably maintaining its direction of magnetization even during a reproduction. The third magnetic layer 16 consists of the same material as that of the first magnetic layer 13.

Magnetic coupling between the second and third magnetic layers 15 and 16 is preferably strong near room temperature and weakened with an increase in temperature. To satisfy this requirement, the second and third magnetic layers 15 and 16 may be constituted by multilayered films.

A protective layer 17 prevents oxidation of the magnetic layers and penetration of water or the like. The protective layer 17 is comprised of a dielectric layer consisting of the same material as that of the dielectric layer 12.

Recording Method for Magneto-Optical Recording Medium

In the recording medium of the present invention, information is recorded on the first and third magnetic layers 13 and 16. Information is recorded on the first magnetic layer by the same method used to record information in a single magnetic layer frequently used in a conventional structure. Information identical to that of the first magnetic layer is recorded on the third magnetic layer 16 simultaneously with the recording operation of the first magnetic layer. Upon completion of recording on the third magnetic layer 16, the information of the third magnetic layer 16 is transferred to the second magnetic layer 15 by magnetic coupling between the second and third magnetic layers 15 and 16 during the cooling process of the medium. The Curie temperatures, film thicknesses, and magnetic characteristics of the second and third magnetic layers must be optimized so as not to cause destruction of the magnetic information of the third magnetic layer by the magnetic information of the second magnetic layer in the recording process of the third magnetic layer 16.

When the direction of dominant magnetization of the second magnetic layer 15 is the same as that of the third magnetic layer 16, the parallel state is stable. However, when the direction of dominant magnetization of the second magnetic layer 15 is opposite to that of the third magnetic layer 16, the antiparallel state is stabilized, thereby transferring the information.

Reproducing Method for Magneto-Optical Recording Medium

The number of combinations of the compositions of the first and second magnetic layers 13 and 15 which influence signal outputs in a reproduction mode is four, as shown in FIGS. 2A to 2D.

FIGS. 2A to 2D are views illustrating the combinations of the compositions of the first and second magnetic layers.

Figure 2A:
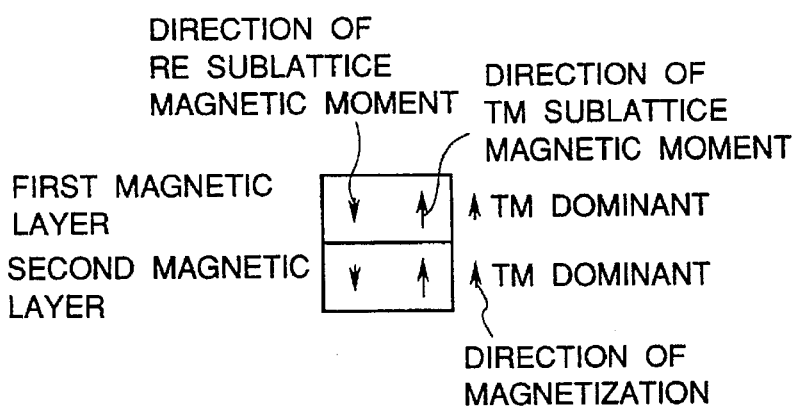
FIGS. 2A to 2D are views illustrating combinations of the compositions of the first and second magnetic layers.
Figure 2B:
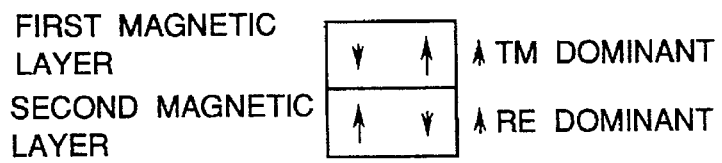
Figure 2C:
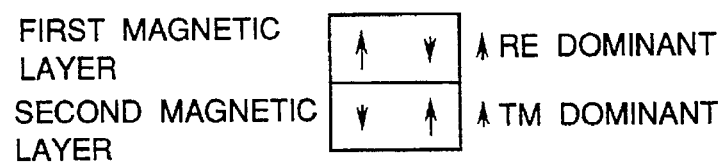
Figure 2D:
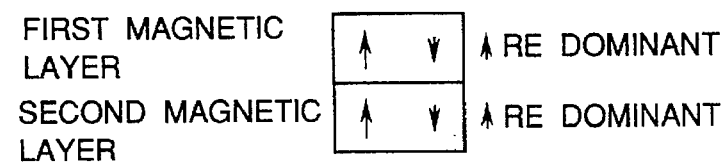

The combination in FIG. 2A will be described below. FIG. 2A shows the combination in which the directions of TM (Transition Metal) sublattice magnetic moments of the first and second magnetic layers 13 and 15 are TM dominant.

Note that there are four combinations in accordance with the directions of magnetization of the first and second magnetic layers 13 and 15, as shown in FIGS. 3A to 3D.

Figure 3A:
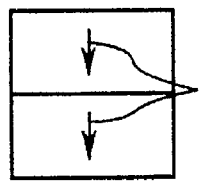
FIGS. 3A to 3D are views illustrating magnetized states of the first and second magnetic layers.
Figure 3B:
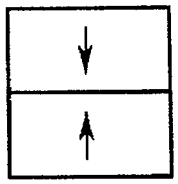
Figure 3C:
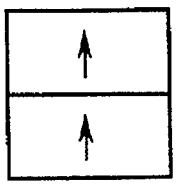
Figure 3D:
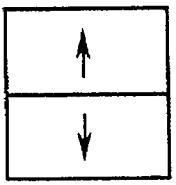

FIGS. 3A to 3D are views illustrating the magnetized states of the first and second magnetic layers. Assuming that both the directions of magnetization of the first and second magnetic layers are downward in the initializing state, as shown in FIG. 3A and both the directions of magnetization of the first and second magnetic layers are upward in the recording state, as shown in FIG. 3C, and a laser beam (laser spot) for reproduction irradiates the medium from the substrate 11 side while an external magnetic field Hr is applied in a direction opposite (downward in this case) to the direction of magnetization of the second magnetic layer 15 in the recording state. Then, part of the second magnetic layer 15 within the laser spot is heated to a temperature higher than the remaining portion of the second magnetic layer 15 within the laser spot. Magnetic coupling between the high temperature portion of the second magnetic layer and the corresponding part of the third magnetic layer is reduced, and the direction of magnetization of only the second magnetic layer 15 is reversed to the direction of the external magnetic field Hr. This state is shown in FIG. 3D.

At this time, magnetization reversal of the first and third magnetic layers 13 and 16 does not occur, and the first and third magnetic layers 13 and 16 hold the magnetized states (note that the second and third magnetic layers are required to have a function of reducing magnetic coupling in the high temperature region, and other layers are added to obtain this function, if necessary; for example, such a layer is preferably an exchange coupling multilayered film or the like).

Figure 4:
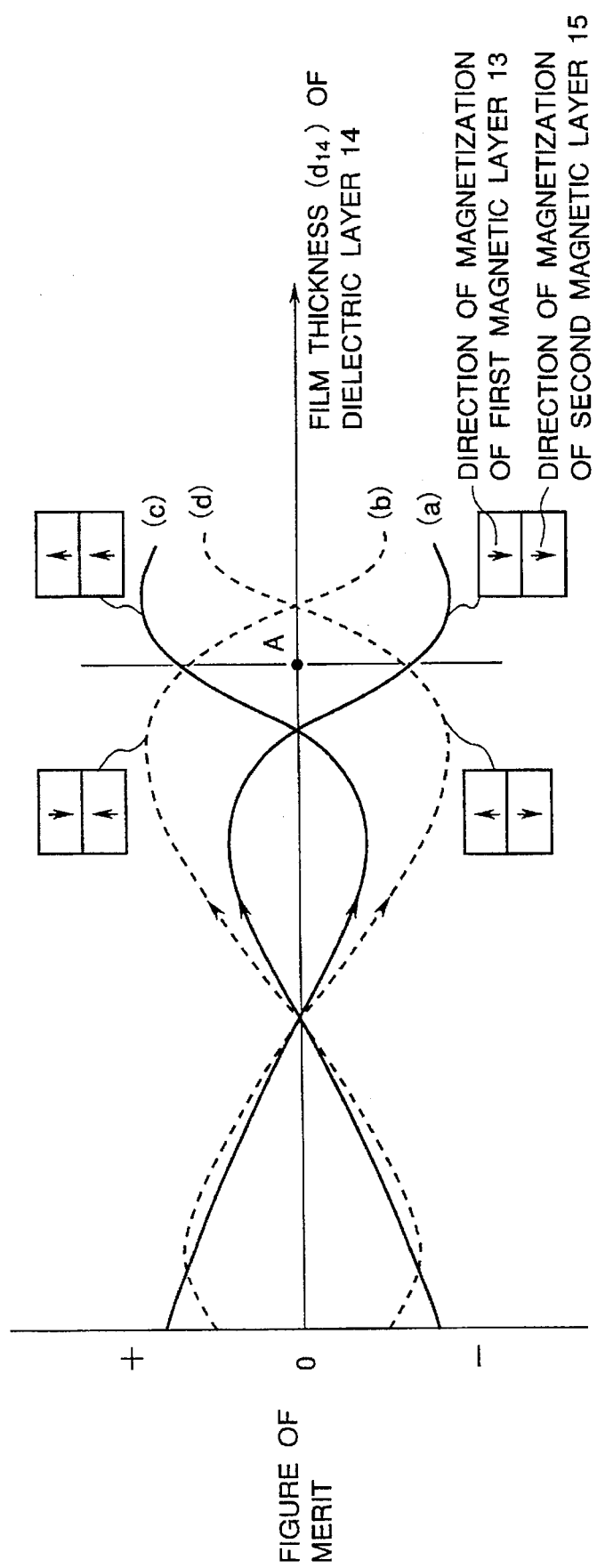
FIG. 4 is a graph showing reproduction outputs (performance indices) upon changes in magnetized states of the first and second magnetic layers.

FIG. 4 shows the magneto-optical effect accompanied by magnetization reversal (direction of magnetization) of the first and second magnetic layers 13 and 15 which influences a reproduction signal.

FIG. 4 is a graph showing the reproduction signal output levels (figure of merit) with changes in the magnetized states of the first and second magnetic layers.

Figure 5:
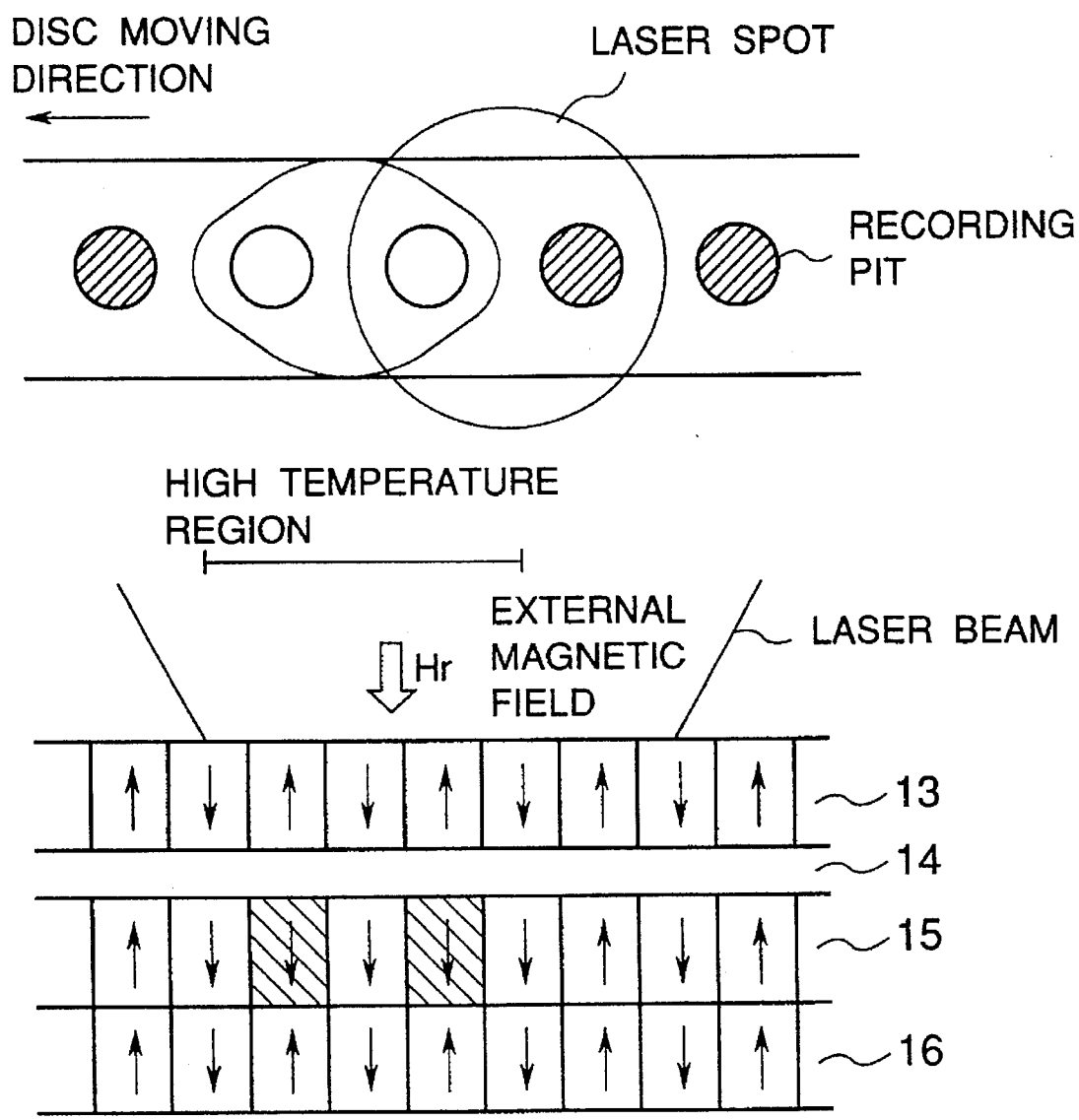
FIG. 5 is a view for explaining an information reproducing method according to the present invention.

Referring to FIG. 4, assume that the film thickness of the dielectric layer 12 is set to 800 Å, that the film thickness of the first magnetic layer 13 is set to a film thickness (in the neighborhood of 100 Å) small enough to transmit a laser beam having a wavelength for reproduction, and that the film thickness of the second magnetic layer 15 is set to a film thickness (400 Å or more) not small enough to transmit the laser beam having the wavelength for reproduction. In this case, when the thickness, $d_{14}$, of the dielectric layer 14 is changed, the figure of merit changes as indicated by curves a to d in FIG. 4 in accordance with the directions of magnetization of the first and second magnetic layers 13 and 15. In a region near $d_{14}=A$, when the directions of magnetization of the first and second magnetic layers 13 and 15 are downward as shown in the curve (a), and by the curve (d), in which the directions of magnetization of the first and second magnetic layers are upward and downward, respectively, then the figure of merits are equal to each other; and when the directions of magnetization of the first and second magnetic layers 13 and 15 are upward as shown in the curve (c), and by the curve (b), in which the directions of magnetization of the first and second magnetic layers are downward and upward, respectively, then the figure of merits are equal to each other. That is, the recording state is given by, curve (c), in which the directions of magnetization of the first and second magnetic layers are upward, while the initializing state is represented by the curve (a), in which the directions of magnetization of the first and second magnetic layers are downward. However, the high temperature region (within the laser spot irradiating the medium in the reproduction mode) in which the direction of magnetization of only the second magnetic layer is reversed downward (the external magnetic field is downward) is represented by the curve (d). This indicates that the signal level is equal to that in the initializing state. That is, the high temperature region is not related to a signal at all, and is masked. That is, the film thickness of the dielectric layer 14 is adjusted so that the level of the reproduction signal is constant in the high temperature region where magnetization of the second magnetic layer is aligned in one direction. This is illustrated in FIG. 5.

Examples of the present invention will be described below.

Experimental Example 1

A dielectric layer 12 consisting of an 800-Å thick $Si_3N_4$ film having a refractive index n=2.10, a first magnetic layer 13 consisting of a 110-Å thick TbFeCo film, a dielectric layer 14 consisting of a 1,600-Å thick $Si_3N_4$ film having a refractive index n=2.10, a second magnetic layer 15 consisting of a 400-Å thick GdFeCo film, a third magnetic layer 16 consisting of a 500-Å thick TbFeCo film, and a protective layer 17 consisting of a 700-Å thick $Si_3N_4$ film having a refractive index n=2.10 were sequentially formed on a PC (polycarbonate) substrate having grooves with a track pitch of 1.6 μm using a magnetron sputtering apparatus, thereby manufacturing a magneto-optical recording medium shown in FIG. 1. The characteristic values of the first, second, and third magnetic layers 13, 15, and 16 of this medium are shown in Table 1.

The recording/reproducing characteristics of the magneto-optical recording medium of Experimental Example 1 were measured. A carrier signal having a frequency of 5.8 MHz to 15 MHz (pit length: 0.78 μm to 0.30 μm) was written under the conditions that the laser wavelength was 780 nm, the numerical aperture N.A. of the objective lens was 0.55, the linear velocity was 9 m/s, the recording power was 7 to 9 mW, and the external recording magnetic field was 500 Oe, and the recording frequency dependency of the C/N ratio was examined while an external magnetic field was kept applied in a direction opposite to that of the external recording magnetic field in the reproduction mode. The reproduction power was set within the range of 1.5 to 3.5 mW so as to obtain a maximum C/N ratio. The results are summarized in Table 2 below.

TABLE 2

|  |  |  | C/N ratio (dB) |  |  |
|---|---|---|---|---|---|
| Recording Frequency (MHz) | 5.8 | 8.0 | 10.0 | 12.0 | 15.0 |
| Pit Length (μm) | 0.78 | 0.57 | 0.45 | 0.38 | 0.30 |
| Experimental Example 1 | 48 | 46 | 42 | 38 | 35 |
| Experimental Example 2 | 47 | 45 | 40 | 35 | 32 |
| Experimental Example 3 | 48 | 46 | 41 | 37 | 35 |
| Experimental Example 4 | 47 | 45 | 41 | 36 | 33 |

TABLE 1

|  | Magnetic Layer | Material | Film Thickness (Å) | Curie Temperature (°C.) | Coercive Force (KOe) |
|---|---|---|---|---|---|
| Experimental Example 1 | First magnetic layer | TbFeCo | 110 | 180 | >10 |
|  | Second magnetic layer | GdFeCo | 400 | 330 | 0.2 |
|  | Third magnetic layer | TbFeCo | 500 | 240 | >10 |
| Experimental Example 2 | First magnetic layer | DyFeCo | 120 | 190 | >10 |
|  | Second magnetic layer | GdFeCo | 450 | 350 | 0.2 |
|  | Third magnetic layer | DyFeCo | 600 | 250 | >10 |
| Experimental Example 3 | First magnetic layer | GdTbFeCo | 100 | 190 | >10 |
|  | Second magnetic layer | DyGdFeCo | 400 | 340 | 0.1 |
|  | Third magnetic layer | GdTbFeCo | 400 | 250 | >10 |
| Experimental Example 4 | First magnetic layer | TbDyFeCo | 110 | 180 | >10 |
|  | Second magnetic layer | DyGdFeCo | 400 | 350 | 0.15 |
|  | Third magnetic layer | TbFeCo | 500 | 230 | >10 |
| Experimental Example 5 | First magnetic layer | TbFeCo | 110 | 180 | >10 |
|  | Second magnetic layer | GdFeCo | 420 | 360 | 0.20 |
|  | Third magnetic layer | GdTbFeCo | 400 | 240 | >10 |
| Comparative Example | First magnetic layer | TbFeCo | 800 | 180 | >10 |

TABLE 2-continued

| | | | | C/N ratio (dB) | |
| --- | --- | --- | --- | --- | --- |
| Experimental Example 5 | 48 | 46 | 42 | 37 | 34 |
| Comparative Example | 48 | 42 | 31 | 12 | 0 |

Experimental Examples 2–5

Magneto-optical recording media identical to that of Experimental Example 1 were manufactured following the same procedures as in Experimental Example 1 except that the materials and characteristics (film thickness, Curie temperature, and coercive force) of first, second, and third magnetic layers 13, 15, and 16 were changed as shown in Table 1, and the resultant magneto-optical recording media were measured under the same conditions as in Experimental Example 1. The results are summarized in Table 2.

Comparative Example 1

Following the same procedures as in Experimental Example 1, a dielectric layer consisting of an 800-Å thick $Si_3N_4$ film having a refractive index n=2.10, a magnetic layer consisting of an 800-Å thick TbFeCo film, and a protective layer consisting of a 700-Å thick $Si_3N_4$ film having a refractive index n=2.10 were formed on a PC substrate as in Experimental Example 1, thereby manufacturing a magneto-optical recording medium as Comparative Example 1.

The measurements of this magneto-optical recording medium were performed under the same conditions as in Experimental Examples. The results are summarized in Tables 1 and 2.

As has been described above, when a magneto-optical recording medium of the present invention is used and information reproduction is performed using this medium, information having a period less than the size of a laser spot can be reproduced. A high C/N ratio can be obtained at a high linear recording density, thereby achieving high-density recording.

What is claimed is:

1. A magneto-optical recording medium comprising:
   a substrate;
   a first magnetic layer provided on said substrate and constituted by a perpendicular magnetization film;
   a dielectric layer provided on said first magnetic layer at a side opposite to said substrate;
   a second magnetic layer provided on said first magnetic layer through said dielectric layer; and
   a third magnetic layer magnetically coupleable with said second magnetic layer,
   wherein a coercive force of said second magnetic layer is smaller than a coercive force of said first and third magnetic layers.

2. A medium according to claim 1, wherein each of said first, second, and third magnetic layers essentially consists of a rare earth-transition metal amorphous alloy.

3. A medium according to claim 1, wherein said first magnetic layer has a film thickness which allows transmission of light incident from said substrate to said dielectric layer.

4. A medium according to claim 3, wherein said second magnetic layer has a film thickness which does not allow transmission of light passing through said first magnetic layer, to said third magnetic layer.

5. A medium according to claim 1, wherein said third magnetic layer is magnetically coupled to said second magnetic layer by exchange coupling.

6. A medium according to claim 1, wherein information is recorded on said first and third magnetic layers.

7. A reproducing method for a magneto-optical recording medium including a substrate, a first magnetic layer provided on the substrate, a recording bit being formed on the first magnetic layer, a dielectric layer provided on the first magnetic layer at a side opposite to the substrate, a second magnetic layer provided on the first magnetic layer through the dielectric layer, and a third magnetic layer magnetically coupleable with the second magnetic layer, the same recording bit as formed in the first magnetic layer being formed on the third magnetic layer, wherein a coercive force of the second magnetic layer is made smaller than a coercive force of the first and third magnetic layers, said method comprising the steps of:
   irradiating the medium with a laser spot from the substrate side;
   applying to the laser irradiated portion of the medium an external magnetic field of a direction opposite to the direction of magnetization of the recording bit so as to align the magnetization of the second magnetic layer corresponding to a high temperature region within the laser spot in one direction; and
   detecting light of the laser beam reflected from said medium and generating a reproduction signal,
   wherein a thickness of the dielectric layer is adjusted such that an output level of the reproduction signal is made substantially constant in a region in which the magnetization of the second magnetic layer has been aligned in the one direction irrespective of the direction of magnetization of the first magnetic layer.

8. A method according to claim 7, further comprising the step of transferring information of the third magnetic layer by magnetic coupling to a portion of the second magnetic layer which corresponds to a low temperature region within the laser spot.

9. A method according to claim 8, wherein a magneto-optical effect of said third magnetic layer is not related to the reproduction signal.

\* \* \* \* \*

UNITED STATES PATENT AND TRADEMARK OFFICE
CERTIFICATE OF CORRECTION

PATENT NO. : 5,661,716
DATED : August 26, 1997
INVENTOR(S) : ICHIRO SAITO

It is certified that error appears in the above-indentified patent and that said Letters Patent is hereby corrected as shown below:

<u>COLUMN 2</u>

Line 10, "thereof" should read --thereof;--.
        Line 27, "in" should read --in the--.

Signed and Sealed this

Twenty-fourth Day of February, 1998

Attest:

BRUCE LEHMAN

Attesting Officer      Commissioner of Patents and Trademarks